Patented May 4, 1954

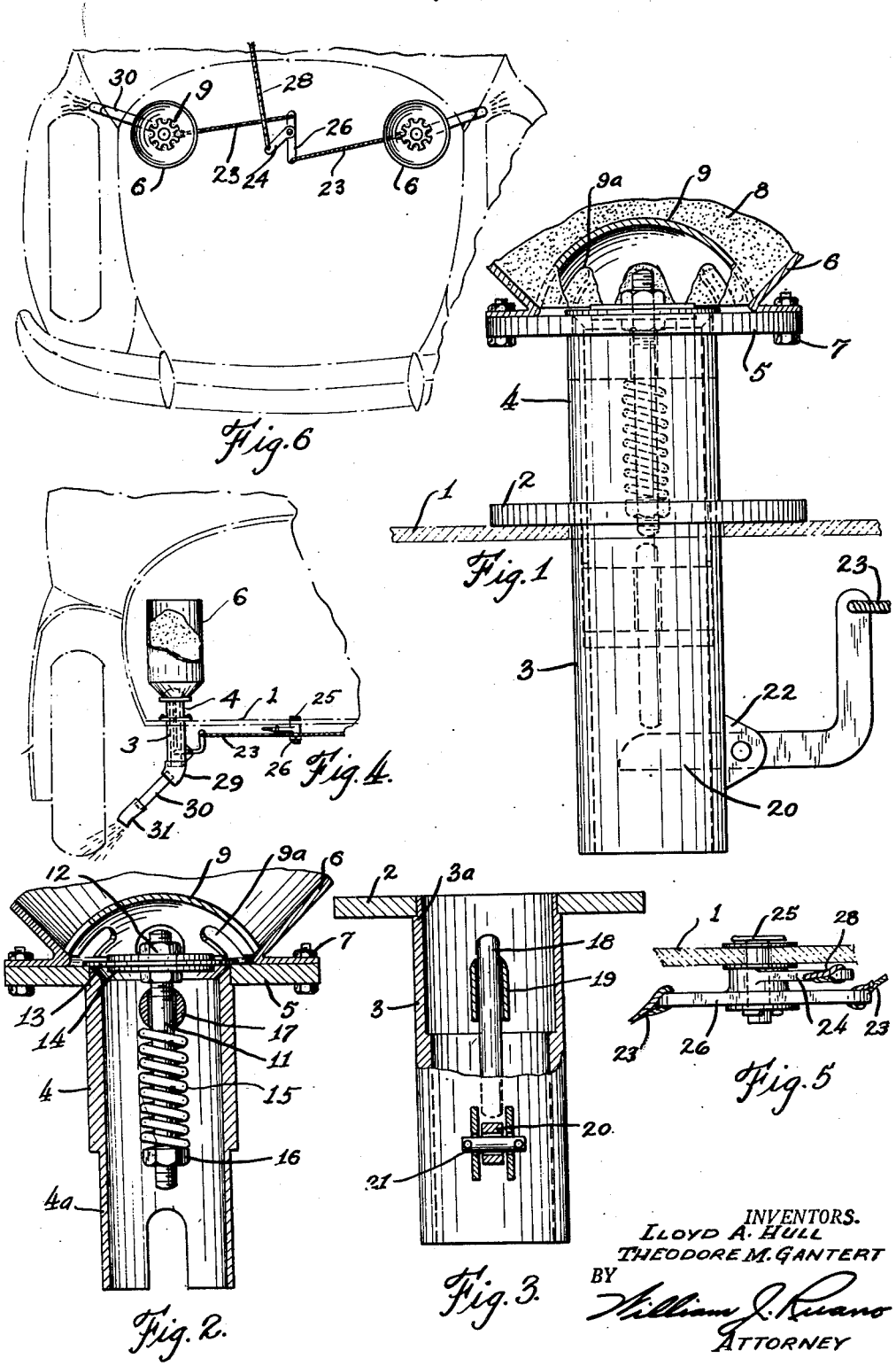

2,677,564

UNITED STATES PATENT OFFICE 2,677,564

ROAD SANDER FOR VEHICLES

Lloyd A. Hull, Ephrata, and Theodore M. Gantert, Bernville, Pa.

Application May 20, 1953, Serial No. 356,172

4 Claims. (Cl. 291—36)

This invention relates to a road sander for automobiles, trucks, and similar vehicles, and more particularly to a sander assembly for discharging sand forwardly of the vehicle rear wheels and which assembly can be easily mounted on, or dismounted from a vehicle.

In the past many attempts have been made to provide a sander suitable for automobiles and trucks, and various constructions have been devised, however these have not been found to be satisfactory, which accounts for the fact that, up to the present time, sanders have not been widely adopted for use in automobiles. Prior constructions have generally been cumbersome and not reliable in operation, furthermore, they have not been susceptible of easy removal of the hopper or storage unit without spilling sand, nor have they been adapted for easy and quick installation on an existing automobile.

An object of our invention is to provide a sander assembly for automobiles, trucks and similar vehicles, which assembly is devoid of the above named disadvantages and which can be easily and quickly installed in almost any make of automobile or truck without the necessity of the services of a mechanic.

Another object of the present invention is to provide a novel, double valve assembly for controlling the flow of sand or other anti-skid material, and which enables quick removal of a hopper or other storage unit for refilling purposes without the necessity of unfastening any parts, and without spilling any of the contents during such removal.

A still further object of the invention is to provide a sander assembly of relatively simple construction which may be easily installed in the trunk or other part of an automobile and which is positive in operation, insuring the flow of sand when needed under various conditions of weather.

Other objects and advantages of our invention will become apparent from a study of the following description taken with the accompanying drawing wherein:

Figure 1 is an enlarged side elevational view, with parts broken away, of a hopper and valve assembly embodying the principles of our invention.

Figure 2 is an enlarged longitudinal cross-sectional view of the upper part of the assembly shown in Figure 1.

Figure 3 is an enlarged elevational view, partly in longitudinal cross section, of the lower part of the assembly shown in Figure 1.

Figure 4 is a rear elevational view showing the hopper and valve assembly mounted in the trunk of a passenger automobile.

Figure 5 is an enlarged view of the bellcrank or pulley shown in Figure 4, and

Figure 6 is a plan or top view of the mounting shown in Figure 4, together with a duplicate mounting on the other side of the car, whereby the roadway forward of both rear wheels is sanded.

Referring more particularly to Figure 1, numeral 1 denotes the floor of a car or truck, such as, for example, the floor in the trunk portion of a passenger car. Mounted on the floor 1, or any other suitable support portion of the car, is an annular plate 2 of steel, aluminum or other suitable metal, which can be quickly and easily fastened to the floor by means of about three screws (not shown) or other suitable fastening means. Integrally secured, such as by welding, to the inner periphery of plate 2 is a lower pipe or sleeve 3 having a machined upper portion 3a of greater diameter than the lower portion, as shown more clearly in Figure 3, for slidably receiving a correspondingly machined portion of 4a of an upper sleeve or pipe 4, as shown more clearly in Figure 2. That is to say, the lower pipe portion 4a of reduced diameter, in the assembly of Figure 2, telescopically fits into the upper pipe portion 3a of the assembly shown in Figure 3, so as to form the complete assembly shown in Figure 1. Therefore, it will be readily apparent that the parts of the general assembly may be easily and quickly taken apart by simply lifting the assembly of Figure 2 from that of Figure 3, without unfastening any parts, such as the valve parts.

The upper part of the valve and hopper assembly, shown in Figure 2, has integrally secured to the upper end of pipe 4 an annular plate 5, such as by welding, hard soldering or the like. Supported on plate 5 is a hopper 6 which may be filled with sand, cinders or other suitable antiskid material 8 for providing traction to the tires of the car on ice and snow. A lower flanged portion of hopper 6 is fastened to plate 5 by means of bolts 7, or other suitable fastening means, such as screws or the like. At the lower or outlet portion of hopper 6 there is provided a hopper baffle 9 having holes 9a for screening the sand or other anti-skid material against entry of large particles which might clog pipes 3 and 4.

A positive acting valve is provided, comprising a valve stem 11 having screw-threaded to the top end thereof nuts 12 for firmly fastening to the top of the valve stem a valve element comprising a large washer 13 of either metal or rubber sandwiched between smaller washers 14, preferably of metal. The valve element 13 is yieldingly seated against the top of the lower pipe 4 and against the upper surface of plate 5 by means of a helical spring 15, which encircles the stem. The upper part of spring 15 is urged against a cross piece or guide 17 secured to the inner walls of the upper pipe 4. The tension of spring 15 may be increased by tightening up a lower nut 16 screw-threaded to the lower part of stem 11.

Figure 3 shows the lower portion of the valve assembly, which includes a free-floating operating pin 18, movable vertically and axially of pipe 3 and guided by a guide 19 secured to the inner walls of pipe 3. An operating arm or striker 20 forming part of a bellcrank is pivotally mounted on a pivot 21 supported on a bracket 22, which bracket is welded or otherwise fastened to the outer part of lower pipe 3. To the other end of the bellcrank is fastened a steel cable 23.

In operation, upon pulling the cable 23, arm 21 is lifted and strikes operating pin 18, which, in turn, is lifted sufficiently to strike the lower end of valve stem 11, so as to compress spring 15 and lift the valve element 13 away from its seat and against the action of spring 15, thereby opening the valve in a positive manner and allowing sand to flow therethrough. Of course, when arm 20 is lowered, spring 15 will urge valve element 13 against the valve seat, so as to close the valve and stop the flow of sand. If desired, the part including bracket 22 and pivot 21 may be enclosed by means of a rubber tube which encircles a portion of lower pipe 3, to prevent entry of moisture through the opening formed in the part of pipe 3 through which arm 20 extends.

Figures 4, 5 and 6 show the valve and hopper assembly mounted in the trunk of a passenger car. Two hopper and valve assemblies may be employed, one on each side of the car trunk and of the same construction shown in Figures 1, 2 and 3, as will be apparent from Figure 6. Thus, each of the rear wheels may be provided with anti-skid material, that is, on the roadway portion immediately in front of the rear wheels.

The cables 23 coming from the respective sander assemblies may have their ends connected to a bellcrank or pulley 26, which may be of a construction shown more clearly in Figure 5. The bellcrank 26 is pivotally mounted underneath the level of floor 1 by means of a pivot 25 extending through the floor, and may be rotated by an operating arm 24 which may be operated by means of a cable 28 which may lead to the dash board of a car for convenient operation by the driver, such as by pulling of a knob at the end of the cable, which knob is mounted on the dash board (not shown).

A rubber sleeve 29 may be mounted on the lower portion of pipe 3, part of which may cover bracket 22, and to the lower end of which may be secured a short pipe 30 of aluminum, stainless steel or the like, which may be fastened to the frame of the car. To the low end of pipe 30 there may be secured a rubber hose 31 for leading the sand onto the roadway immediately in front of the rear wheels of the car to prevent the outlet from being closed with snow.

Instead of mounting the valve and hopper assembly in the trunk, it may be mounted on other portions of the car. While a pair of assemblies are shown, it will be apparent that four of them may be used, particularly for trucks, or merely one for supplying both rear wheels of a passenger car, in which case a pair of hoses will be connected to the outlet.

Thus it will be seen that we have provided an efficient sander for automobiles and trucks for insuring traction on ice and snow, which may be easily and quickly installed in a small trunk space on existing vehicles, and which comprises positive acting valves of a construction which will insure positive opening and closing of the valves at all times; furthermore, we have provided a hopper and valve assembly wherein the hopper portion may be removed easily and quickly by simply lifting it from the remainder of the assembly and removed without spilling sand and without the necessity of taking any of the valve elements apart, thereby facilitating refilling of the hopper such as when the hopper is taken to a sand pile for scooping up a new supply of sand; furthermore, we have provided a sander of relatively simple construction, involving a minimum number of parts, therefore which may be inexpensively manufactured and which may be easily and quickly installed on any make of automobile or truck by an unskilled person, by simply screwing about two or three screws onto the floorboard.

We claim:

1. A road sander for preventing skidding of automobiles, trucks, and similar vehicles, comprising, in combination, a stationary support, a removable hopper assembly supported thereon comprising a hopper and a valve adjacent the outlet of said hopper, a spring mounted in said removable hopper assembly for normally biasing said valve to the closed position, said stationary support including a longitudinally movable operating pin which is adapted to move into and out of contact with said valve to open it against the action of said spring, whereby said hopper assembly can be removed as a unit without unfastening any said parts of the sander or opening of the valve, therefore without spilling sand through said valve.

2. A roadway sander for providing an anti-skid surface for the wheels of an automobile, truck, or similar vehicle, comprising, in combination, a stationary cylindrical support including an axially movable operating member, a hopper assembly including a cylindrical member telescopically fitted in said cylindrical support and including a valve having spring means for normally biasing said valve in the closed position, control means for longitudinally moving said operating member and including a cable, said operating member being disconnected from said valve, whereby said hopper assembly may be quickly removed from said stationary support without the necessity of unfastening any of the above mentioned parts of the sander.

3. A roadway sander for providing an anti-skid roadway surface for automobiles, truck, and similar vehicles, comprising, in combination, a stationary support which is adapted to be fastened to a floor portion of the vehicle, including a cylindrical member and an operating rod movable axially within said cylindrical member, and control means for moving said rod, a quickly removable hopper assembly including a spring closed valve in the outlet of the hopper of said assembly, said valve being disconnected from said operating rod but adapted to be contacted and opened as the result of upward movement of said operating rod, said hopper assembly including a cylindrical portion telescopically fitted in said stationary support, whereby lifting of said hopper assembly may be effected without opening said valve or unfastening said operating rod.

4. In a roadway sander for providing traction for an automobile or truck on a snow or ice covered roadway, an annular member adapted to be fastened to a floor portion of the vehicle, and having integrally secured thereto a depending cylindrical pipe, adapted to extend through the floor, said pipe having a bored out portion of larger diameter in its upper portion, an axially movable striker pin supported in said pipe, a lever pivotally mounted on said pipe and adapted to strike the lower end of said pin to lift it, a second pipe having a lower portion of reduced diameter adapted to telescopically fit into said bored out portion of the first mentioned pipe, a hopper secured to the top of said second pipe, a cross piece supported in said second pipe and having an axial hole for guiding a valve stem, a valve secured to the upper part of said stem and biased to the closed position by a helical spring surrounding the stem, whereby lifting movement of said pin will effect contact and lifting movement of said valve stem and opening of said valve, and whereby said upper pipe and hopper may be telescopically lifted from said second pipe without disturbing or affecting said valve.

No references cited.